March 8, 1966  W. J. PARKS  3,238,799
DOUBLE WEDGE RING ADJUSTMENT MEANS
Filed July 12, 1962  3 Sheets-Sheet 1

INVENTOR.
WALTER J. PARKS, DECEASED
BY ROBERT L. BAKER, EXECUTOR
BY
*Fay & Fay*
ATTORNEYS

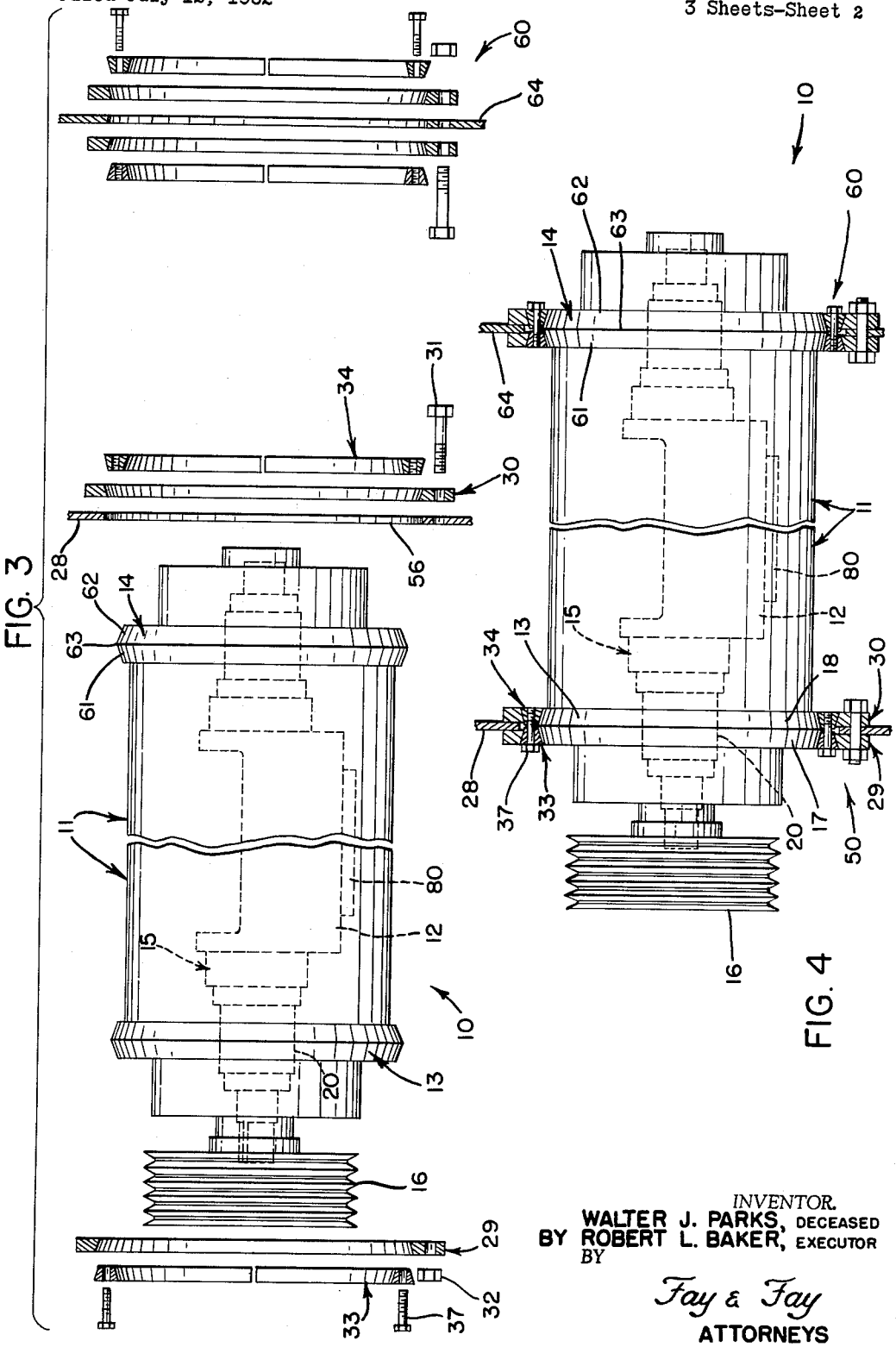

March 8, 1966 W. J. PARKS 3,238,799
DOUBLE WEDGE RING ADJUSTMENT MEANS
Filed July 12, 1962 3 Sheets-Sheet 3

INVENTOR.
WALTER J. PARKS, DECEASED
BY ROBERT L. BAKER, EXECUTOR
BY
*Fay & Fay*
ATTORNEYS

United States Patent Office 3,238,799
Patented Mar. 8, 1966

3,238,799
DOUBLE WEDGE RING ADJUSTMENT MEANS
Walter J. Parks, deceased, late of Cleveland, Ohio, by Robert L. Baker, executor, Auburn Township, Geauga County, Ohio, assignor to W. S. Tyler, Incorporated, a corporation of Ohio
Filed July 12, 1962, Ser. No. 211,468
5 Claims. (Cl. 74—87)

This invention relates to an improvement in vibratory mechanisms for screening devices and the like. Vibratory devices have found wide acceptance in commercial and industrial uses to effect segregation and conveyance of materials. More particularly, this invention relates to a vibratory mechanism which may be conveniently removed and replaced with a minimum of effort and time.

Vibrating mechanisms, due to their constant vibrational movement, operate efficiently only for approximately two hundred hours in most applications. At this time it becomes necessary to remove the vibrating mechanism and install a new or reconditioned unit. In consequence of the repeated replacement, down time of the machine has become an important criterion in seeking a suitable design to facilitate quick removal and installation of the vibrating mechanism.

Economical manufacturing techniques dictate that processing machinery should be used as near to capacity as good judgment permits. Vibrating mechanisms are therefore depended upon to supply materials for subsequent processing machines which are most generally run at near capacity. If a failure or down time of any substantial period exists in the vibrating operation, this, accordingly, affects subsequent operations in that the required materials are not readily available, which causes expensive machinery to be idle. Accordingly, in order to effect efficient operation of a plant employing vibrating mechanisms, it is necessary to minimize the costly down time by providing a simple, yet quickly attachable and detachable, connection to hold the vibrator in the machine.

Prior art devices have been proposed in an effort to cope with this problem. However, solutions which have been rendered are of questionable value. Most generally the connections are bulky, which adds to the dead load of the machine and impairs the efficiency thereof. Additionally, connections falling into this category are expensive to make and require excessive time to install. Other types of prior art devices require welded connections, thereby necessitating side plates of substantial thickness in order to facilitate a good connection, as well as to support the dead load of the vibrator during assembly and disassembly. It can be appreciated that the above techniques of joining are time consuming as well as costly.

In the most ideal joint, it is desirable that a rigid connection be had between the frames of the vibratory mechanism and the vibratory mechanism itself in order that the vibrations be efficiently imparted to the screening device. Moreover, the connecting portion must provide a structure which will oppose forces to counteract any shifting of the support member felt by varying screen loads. Further, the connection should render support to the opening around the supporting frame member, thereby making it possible to minimize the thickness of the support member to lighten the dead load without sacrificing fatigue strength. Further, the supports should hold the vibrator in proximate position while the joint is effected. The overall design of the connection should be such that labor of minimal skills can efficiently change the complete vibrating unit in record time, without the possibility of damaging any of the components.

It is therefore an object of the present invention to provide a novel vibratory mechanism and mounting means therefor.

It is a further object of this invention to provide a novel vibrating mechanism and mounting therefor which will provide means which will oppose shear forces existing during the operation of the device.

It is a further object of this invention to provide a rigid connection between a vibrator and the side plates of a vibrating screen or like device in order to derive maximum vibration therefrom.

It is a further object of this invention to provide a novel vibrating mechanism which can be quickly, conveniently and efficiently replaced by labor of minimal skills with a minimum of tools required.

It is a further object of this invention to provide a novel centering and supporting means to hold the vibrator during assembly and disassembly of the novel connecting means.

It is a still further object of this invention to provide a novel vibrating mechanism which will permit drastic reduction in the thickness of the frame members, thereby lightening the dead load and enhancing the overall efficiency of the vibrating device.

Further objects will become apparent when reference is made to the accompanying drawings wherein like reference characters indicate like parts.

In the drawings:

FIG. 3 illustrates an exploded plan view of a vibrator and the top half of a connecting means therefor in section with portions of the side plate shown in section fragmentarily;

FIG. 4 is a view similar to FIG. 3 with the connecting elements and fragmentary portions of the frame shown in section in assembled relationship.

Figure 1:
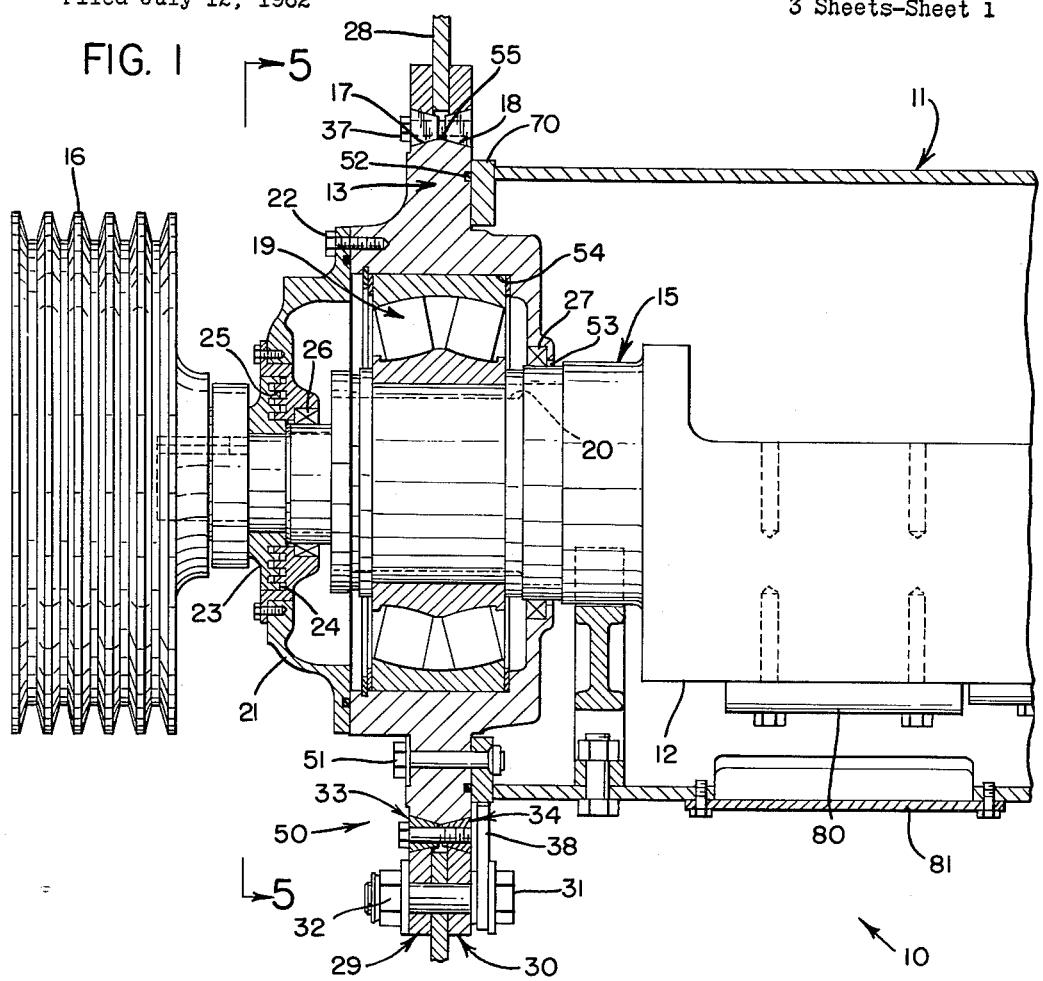
FIG. 1 is a sectional view of the driven end of the vibrating mechanism taken along the line 1—1 of FIG. 5.

FIG. 1 illustrates a sectional view of one end of a vibrating mechanism 10 with a fragment of the side plate being shown. The vibrating mechanism 10 has a circumferential housing 11 which forms a cylindrical chamber to receive a shaft 15, the latter having an eccentric portion 12 thereon contained in the chamber. The housing 11 is attached through reinforced shoulders 70 to an end cap assembly indicated generally at 50 by suitable fastening means, such as bolts 51 or the like. A similar end cap assembly 60 is provided at the opposite end of the housing 11, as is seen in FIG. 3. Suitable seal means 52 is interposed between the housing 11 and the end cap to prevent entry of foreign matter.

The end cap assembly is provided with a bore 53 to receive the shaft 15. A counterbore 54 is provided to receive the outer race of a spherical bearing assembly 19 which is press fitted therein. The inner race is press fitted on a stepped portion 20 of the shaft 15 so as to rotate therewith.

The end cap assembly 50 is provided with a labyrinth seal, the stator portion being shown at 21 affixed to the end cap by bolts 22, and the rotor portion at 23, being press fitted on the shaft 15. The rotor portion 23, being disposed on the outside of the assembly, acts as a slinger to repel any substance coming into contact therewith. A plurality of axially facing teeth 24 on the rotor interfit in the recesses 25 on the stator to provide a tortuous path thereby preventing the ingress of dust and like foreign substances which are prevalent around vibrating devices. Suitable lubricant seals 26 and 27, such as lip seals or the equivalent, are provided on opposite sides of the bearing 19 to prevent egress of the lubricant from the bearing chamber. A drive pulley 16 is keyed to the shaft 15 to impart rotation thereto. It is to be appreciated that the driving means employed to rotate the pulley represents a substantial load which is cantilevered from the end cap assembly. Accordingly, a most rigid connection between the side plate and vibrator is required to oppose this load as well as the dead load of the vibrator and additonal loads introduced when the vibrator is in operation.

The end cap assembly 50 has a radially extending flange portion 13 which terminates in frusto-conical surfaces 17 and 18 merging to form an apex portion 55. The apex portion 55 will be positioned centrally of the side plate 28, shown fragmentarily, when the vibrating mechanism is in the installed position.

Figure 2:
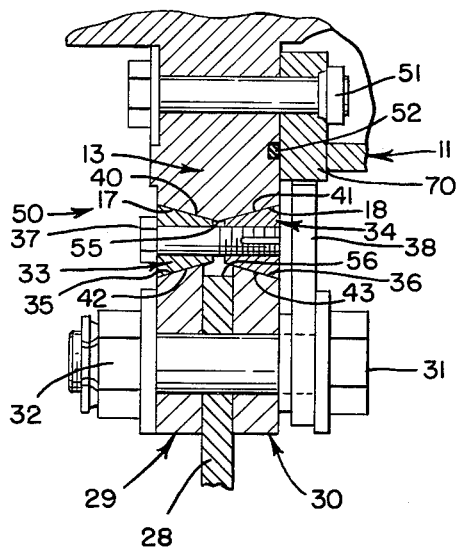
FIG. 2 is an enlarged view of the novel wedge means to connect the vibrating mechanism to the frame, with fragmentary portions of the vibrating mechanism and frame shown in section.

With reference to FIGS. 3 and 4, it can be seen that the end cap assembly 60 is similar to end cap 50, with the exception that the end cap assembly 60 extends across the end of the shaft to seal the end from ingress of foreign materials. The end cap assembly 60 is provided with a flange portion 14 which terminates in oppositely frusto-conical portions 61 and 62 which merge to form apex 63. Since the joining of the flange 14 to the side plate 64 is identical to the steps required with respect to flange 13 and side plate 28, the description will be restricted to the embodiment shown in FIGS. 1 and 2, embdoying flange 13 and side plate 28.

The side plate 28 is provided with an aperture or opening 56 of a greater diameter than the apex portion 55 of the flange. A plurality of holes surround the opening 56 to receive bolts, as will hereinafter be described.

Wedge rings 29 and 30 are disposed on opposite sides of the side plate 28. As is well known, holes, fillets and like modifications in machine members provide areas of stress concentration. In the instant application the wedge rings serve the dual function of reinforcing the hole 56 while providing oppositely tapering wedge surfaces 35 and 36 on the wedge rings 29 and 30 respectively. The wedge rings are joined to the side plate 28 by headed bolts 31 with a locking type nut 32 thereon. Suitable washers can be used where necessary and/or desirable.

Figure 5:
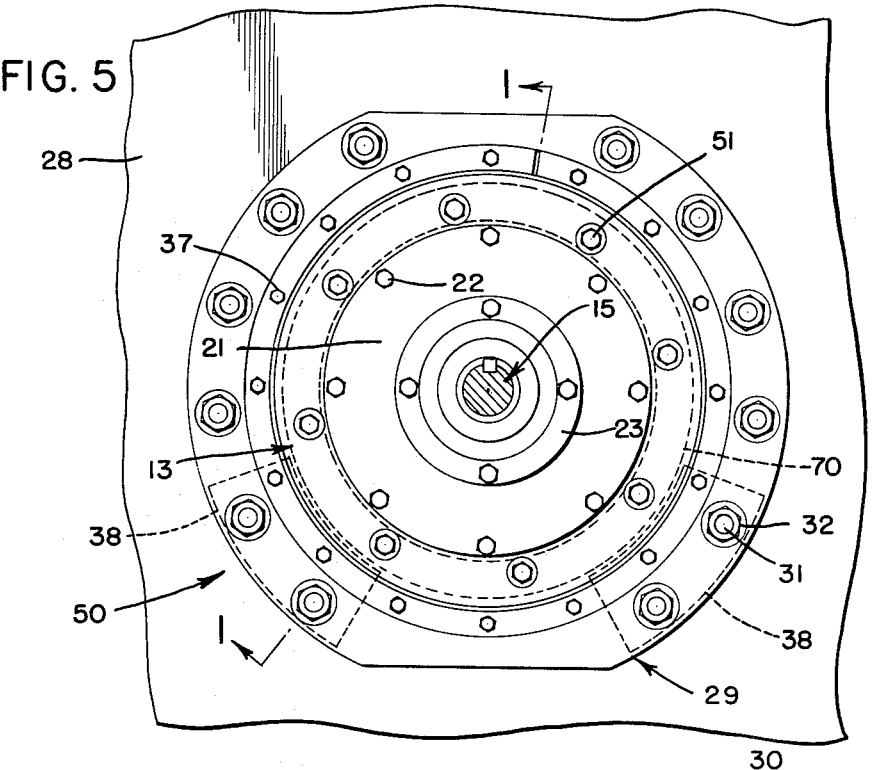
FIG. 5 is a view taken along the line 5—5 of FIG. 1.
Figure 6:
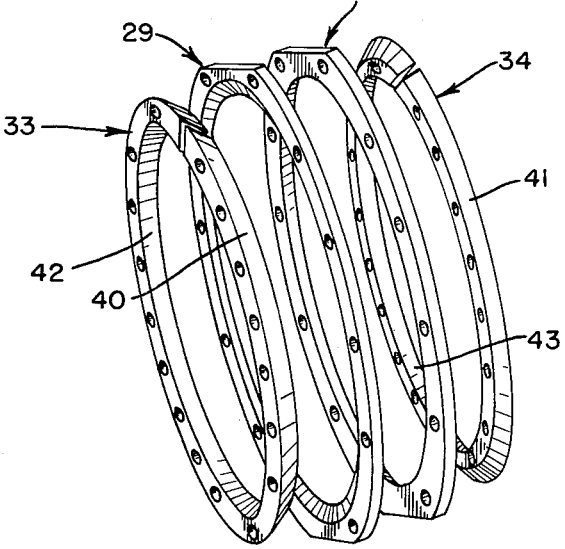
FIG. 6 is an exploded view of a pair of the novel wedge rings with the cooperating wedge plates.

Interposed between the wedge ring 30 and the head of the bolt 31 is a support or centering member 38, which, as is shown, is radially spaced from the periphery of the reinforced shoulder 70 of the housing 11 when the connection is completed. The centering members 38 are shown in phantom in FIG. 5. Similar members are provided in the end cap assembly 60. The centering members 38 support the weight of the vibrator while the wedge members are being drawn up or backed off, thereby permitting a minimum number of workmen to remove or install the unit. Moreover, the centering members 38 prevent the vibrator from falling into the interior of the machine, which would cause damage to any mechanism below the vibrator. Further, the release of the wedge members could cause the vibrator to fall to the floor in the absence of the centering and supporting members 38 and no obstructing mechanism therebelow, such as a screen or the like.

Interposed between the frusto-conical surfaces 17 and 18 on the flange 13 and like frusto-conical surfaces 35 and 36 on the wedge ring are a pair of split wedge members 33 and 34. Each of the wedge members is uniformly tapered as viewed in cross section, with the angularity thereof being complementary to the angle of taper of the intended cooperating surfaces. The wedge members have a natural tendency to expand due to their inherent resilience so that the ends at the split are spaced in the free state.

When the wedge members 33 and 34 are assembled as shown in FIGS. 1, 2, 4 and 5, they are held together by a series of bolts 37, which extend through the wedge member 33 and are threadably received in wedge member 34. The bolts 37 illustrated are the self-locking type sold under the tradename "Long Lok"; however, any suitable equivalent may be used. Rotation of the bolts 37 draws the wedge members 33 and 34 towards each other with the attendant constricting thereof. During this operation the frusto-conical surfaces 35 and 36 wedgingly engage the tapered surfaces 42 and 43 of the wedge rings 29 and 30. Simultaneously, the wedge members' surfaces 40 and 41 wedgingly engage the frusto-conical surfaces 17 and 18 on the flange 13, which acts to expand the wedge members. This coaction between wedge surfaces serves to center the vibrator in the aperture.

When the bolts 37 are drawn up tightly, as shown in FIGS. 1, 2, 4 and 5, the wedge members are axially spaced from each other but are tightly in engagement with the flange 13 and the wedge rings 29 and 30. This allows further tightening if such becomes necessary. Thus the vibrator is centered in the opening by the wedge members and rigidly held so that vibrations may be imparted through the side plate 28 to a screening mechanism (not shown) or similar device requiring vibratory movement.

With the novel centering and fastening means of the instant invention, the amplitude of vibrations generated by the eccentric weighted portion 12 can be transmitted to the side frames with no appreciable loss through the connecting means.

It is to be understood that the amplitude of the vibrations can be adjusted from time to time by adding or subtracting mass in the form of removable weights, such as that shown at 80. Such modification is effected by withdrawing the vibrator from the side frames, which is quickly and easily accomplished through the novel connecting means herein described. An inspection plate 81 is bolted to the housing 11 to facilitate removal therefrom and access to the removable weighted portion 80 of the eccentric 12. When the weights are made fast, the plate 81 is replaced and the vibrator is installed in the vibrating device, as was described above.

Removal of the unit is accomplished by the bolts, joining the wedge members, being backed off so that only the endmost portion thereof engages the threaded bores in the ring 34. This permits the rings to expand due to their inherent resilience, heretofore described. The expansion of the rings serves to disconnect the flanges 13 and 14 from the side plates, thus permitting the vibrator to rest on the centering and support means 38. The vibrator as a unit may then be withdrawn laterally from the machine through the expanded wedge members. The weights may then be changed and the unit reused, or a new unit installed, which ever is desirable.

It is to be appreciated that the above steps of installing and removing the vibrator may be easily achieved, requiring a minimum of time and effort. It is further contemplated that high speed torque wrenches could be used to adjust the bolts joining the wedge members, thereby reducing down time of the machine to an absolute minimum, without sacrificing the desired rigid connection.

For ease of illustration an eccentric type vibrator has been shown; however, it is to be understood that a magnetic or other type could be used in practicing the invention. Further, for ease of description the instant invention has been discussed as being used with a screening or like device. However, it is contemplated that any mechanism requiring a connection between a side plate and a machine could embody the principles of the disclosed invention. Therefore, I intend only to be limited by the scope of the appended claims.

I claim:

1. A vibratory type mechanism comprising a vibrator having a housing with flange means at each end thereof, each of said flange means terminating at its outer periphery in frusto-conical surfaces merging to form an apex portion, apertured side plate means surrounding each of said flanges, wedge ring means fixedly attached on opposite sides of said plate means around said aperture, wedge members of frusto-conical cross section engaging each of the frusto-conical surfaces of said flange means and each of said wedge ring means, and means to urge said wedge members together to wedgingly position and hold said vibrator to said plates.

2. The structure of claim 1, wherein the means to urge said wedge members together comprise a plurality of self-locking bolts.

3. The structure of claim 1, wherein each of said plates has vibrator centering and supporting means affixed thereto to center and support said vibrator during assembly and disassembly.

4. A vibrating mechanism comprising plate means having an aperture therethrough, wedge ring means fixedly attached on opposite sides of the aperture, said wedge ring means having frusto-conical surfaces increasing in diameter away from said aperture, a vibrator in said aperture, said vibrator having flange means thereon, said flange means having frusto-conical surfaces at the periphery thereof which terminate in an apex portion, a pair of split wedge members of frusto-conical cross section interposed between said flange members and said wedge rings, each of said wedge members increasing in diameter on the outer periphery and decreasing in diameter on the inner periphery in a direction away from said aperture, and means to draw said wedge members into engagement with said flange means and said wedge rings.

5. The structure of claim 4, further including centering and supporting means mounted on said plate means to hold said vibrator in proximate position to said aperture while said wedge members are being adjusted.

References Cited by the Examiner

UNITED STATES PATENTS

| 2,502,512 | 4/1950 | Demetriades | 287—52.06 |
| 2,702,634 | 2/1955 | Roubal | 209—367 |
| 2,964,186 | 12/1960 | Ferrara | 209—366.5 |
| 3,014,740 | 12/1961 | Bogosian | 242—2 XR |

FOREIGN PATENTS

| 1,098,459 | 3/1955 | France. |
| 1,237,790 | 6/1960 | France. |
| 657,919 | 3/1934 | Germany. |

HARRY B. THORNTON, *Primary Examiner.*